United States Patent
Paik et al.

(10) Patent No.: US 11,586,967 B2
(45) Date of Patent: Feb. 21, 2023

(54) SYSTEM AND METHOD TO CONTROL QUANTUM STATES OF MICROWAVE FREQUENCY QUBITS WITH OPTICAL SIGNALS

(71) Applicant: INTERNATIONAL BUSINESS MACHINES CORPORATION, Armonk, NY (US)

(72) Inventors: Hanhee Paik, Danbury, CT (US); Patryk Gumann, Tarrytown, NY (US); Martin O. Sandberg, Ossining, NY (US); Jason S. Orcutt, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 728 days.

(21) Appl. No.: 16/591,477

(22) Filed: Oct. 2, 2019

(65) Prior Publication Data
US 2021/0271999 A1    Sep. 2, 2021

(51) Int. Cl.
*G06N 10/00*    (2022.01)
*G06E 1/00*    (2006.01)

(52) U.S. Cl.
CPC .............. *G06N 10/00* (2019.01); *G06E 1/00* (2013.01)

(58) Field of Classification Search
CPC ........... G06N 10/00; G06N 10/40; G06E 1/00
See application file for complete search history.

(56) References Cited

U.S. PATENT DOCUMENTS

| | | |
|---|---|---|
| 8,817,254 B2 | 8/2014 | Santori et al. |
| 9,296,609 B2* | 3/2016 | Park ..................... B81B 3/0029 |
| 9,350,460 B2 | 5/2016 | Paik |
| 2016/0308502 A1 | 10/2016 | Abdo et al. |
| 2017/0248832 A1 | 8/2017 | Kippenberg et al. |
| 2018/0232652 A1 | 8/2018 | Curtis et al. |
| 2018/0260730 A1* | 9/2018 | Reagor ................. G06F 15/82 |

FOREIGN PATENT DOCUMENTS

EP    3 270 516 A1    1/2018

OTHER PUBLICATIONS

Blum et al., "Interfacing microwave qubits and optical photons via spin ensembles," Physical Review A, Jan. 2015, 15 pages.

* cited by examiner

*Primary Examiner* — Daniel D Chang
(74) *Attorney, Agent, or Firm* — Amin, Turocy & Watson, LLP

(57) ABSTRACT

A quantum computer includes a quantum computing system; a transducer disposed inside the quantum computing system, the transducer being configured to receive an optical control propagating wave and output a microwave control propagating wave; and a quantum processor comprising a plurality of qubits, the plurality of qubits being disposed in the quantum computing system, each qubit of the plurality of qubits being configured to receive at least a portion of the microwave control propagating wave to control a quantum state of each qubit of the plurality of qubits.

22 Claims, 3 Drawing Sheets

SYSTEM AND METHOD TO CONTROL QUANTUM STATES OF MICROWAVE FREQUENCY QUBITS WITH OPTICAL SIGNALS

BACKGROUND

The currently claimed embodiments of the present invention relate to superconducting quantum processors, and more specifically, to methods and systems to control quantum states of qubits using optical radiation.

Quantum computation is based on the reliable control of quantum bits (referred to herein throughout as qubits). The fundamental operations required to realize quantum algorithms are a set of single-qubit operations and two-qubit operations which establish correlations between two separate quantum bits. The realization of high fidelity two-qubit operations may be desirable both for reaching the error threshold for quantum computation and for reaching reliable quantum simulations.

The superconducting quantum processor (having one or more superconducting qubits) includes superconducting metals (e.g., Al, Nb, etc.) on an insulating substrate (e.g., Si or high resistivity Si, $Al_2O_3$, etc.). The superconducting quantum processor is typically a planar two-dimensional lattice structure of individual qubits linked by a coupler in various lattice symmetry (for example, square, hexagonal, etc.), and a readout structure located on a flip-chip. The couplers can be made of a capacitor, a resonator, a coil or any microwave component that provides a coupling between qubits.

Qubit control signals include quantum gates that manipulate the quantum states of the microwave qubits and readout signals that measure the quantum states. The control signals are at microwave frequencies. For example, for a single-qubit gate, the typical pulse can be Gaussian and the gate time is around 10 ns to 100 ns. The energy of the single-qubit gate is a single photon and the microwave power is about $10^{-16}$ to $10^{-17}$ Watts. For two-qubit gate, the pulse shape depends on the type of the two-qubit gate. For example, the cross-resonance gate can use a flat-top pulse with hyperbolic secant envelop. The resonator-induced phase gate can use a cosine envelop or other mathematically formulated envelop. The gate time can vary from 50 ns to 1000 ns and the power is typically 100 times stronger such that the single qubit gate and is about $10^{-14}$ to $10^{-15}$ Watts. For readout, a square pulse can be used, for example. The pulse length is about 1000 ns to about 10000 ns. The power is about $10^{-18}$ to $10^{-19}$ watts, 100 times smaller than the power of the single-qubit gate.

Qubit control waveforms are delivered via control lines connected to microwave qubits. For a superconducting qubit architecture, Microwave lines and microwave qubits are required to be cold at cryogenic temperature to suppress thermal noise. Superconducting qubits are controlled by microwave propagating waves transmitted through microwave lines that go through a cryostat or a refrigerating container (e.g., a dilution refrigerator). These lines are typically coaxial cables that can be made of copper-nickel (CuNi) alloys or stainless steel, for example. The refrigeration container is divided into many compartments, each compartment being maintained at a certain range of cooling temperature. For example, a first compartment is at a temperature around 40 K, a second compartment at a temperature around 3K, a third compartment, at a temperature around 800 mK, a fourth compartment at a temperature around 100 mK and a fifth compartment a temperature around 10 mK. For example, the qubits can be located at the 10 mK stage or compartment. Excitations caused by thermal photons or noise are minimized to enable an appropriate operation of the qubits. In conventional set-ups, a typical thermal excitation is 0.1% or lower. Due to attenuation in the microwave line, there are many challenges to delivering control microwave radiation to qubits. Delivering an adequate power level to the qubits for appropriate control of the qubits without thermal noise remains a challenge.

Quantum computers may employ thousands of qubits, for example on the order of 100000 qubits or more to function at a full capacity. However, to scale up microwave qubits to 100000, thermal load needs to be reduced in the microwave control lines which remains a challenge. Furthermore, it is desirable that the control lines deliver sufficient microwave power to the qubits while the thermal photons or noise are attenuated. Conventional methods and systems, use attenuators and filters. However these systems themselves introduce thermal noise.

Furthermore, the microwave lines are generally bulky (the diameter of a line is on the order of 5 millimeters or more) and can therefore occupy a large volume. This problem is amplified if the quantum computer employs a relatively large number of qubits (e.g., thousands or more) and each qubit uses at least two lines (one for inputting a signal and another for reading the state of the qubit).

SUMMARY

An aspect of the present invention is to provide a quantum computer including a quantum computing system and a transducer disposed inside the quantum computing system. The transducer is configured to receive an optical control propagating wave and output a microwave control propagating wave. The quantum computer further includes a quantum processor comprising a plurality of qubits. The plurality of qubits are disposed in the quantum computing system. Each qubit of the plurality of qubits is configured to receive at least a portion of the microwave control propagating wave to control a quantum state of each qubit of the plurality of qubits.

Another aspect of the present invention is to provide a system for optically controlling a quantum state of a qubit. The system includes a quantum computing system; and a transducer disposed inside the quantum computing system. The transducer is configured to convert an optical control propagating wave into a microwave control propagating wave. The system also includes at least one qubit disposed inside the quantum computing system. The at least one qubit is configured to receive the microwave control propagating wave to control one or more quantum states of the at least one qubit.

In an embodiment, the transducer is a three-wave mixing optical to microwave transducer which includes a first input port configured to receive a first optical control propagating wave at a first optical frequency; a second input port configured to receive a second optical propagating wave at a second optical frequency, the second optical frequency being different from the first optical frequency; and an output port configured to output a microwave control propagating wave at a microwave frequency equal to a difference between the first optical frequency and the second optical frequency as a result of a non-linear interaction of the first optical control propagating wave and the second optical propagating wave in said transducer. The microwave control propagating wave is output by the transducer inside the quantum computing system.

A further aspect of the present invention, is to provide a method for optically controlling a quantum state of a qubit. The method includes inputting an optical control propagating wave into a transducer disposed inside a quantum computing system; converting, by the transducer, at least a portion of said optical control propagating wave into a microwave control propagating wave; outputting, by the transducer, the microwave control propagating wave; and controlling a quantum state of a qubit disposed inside the quantum computing system using at least a portion of said microwave control propagating wave.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
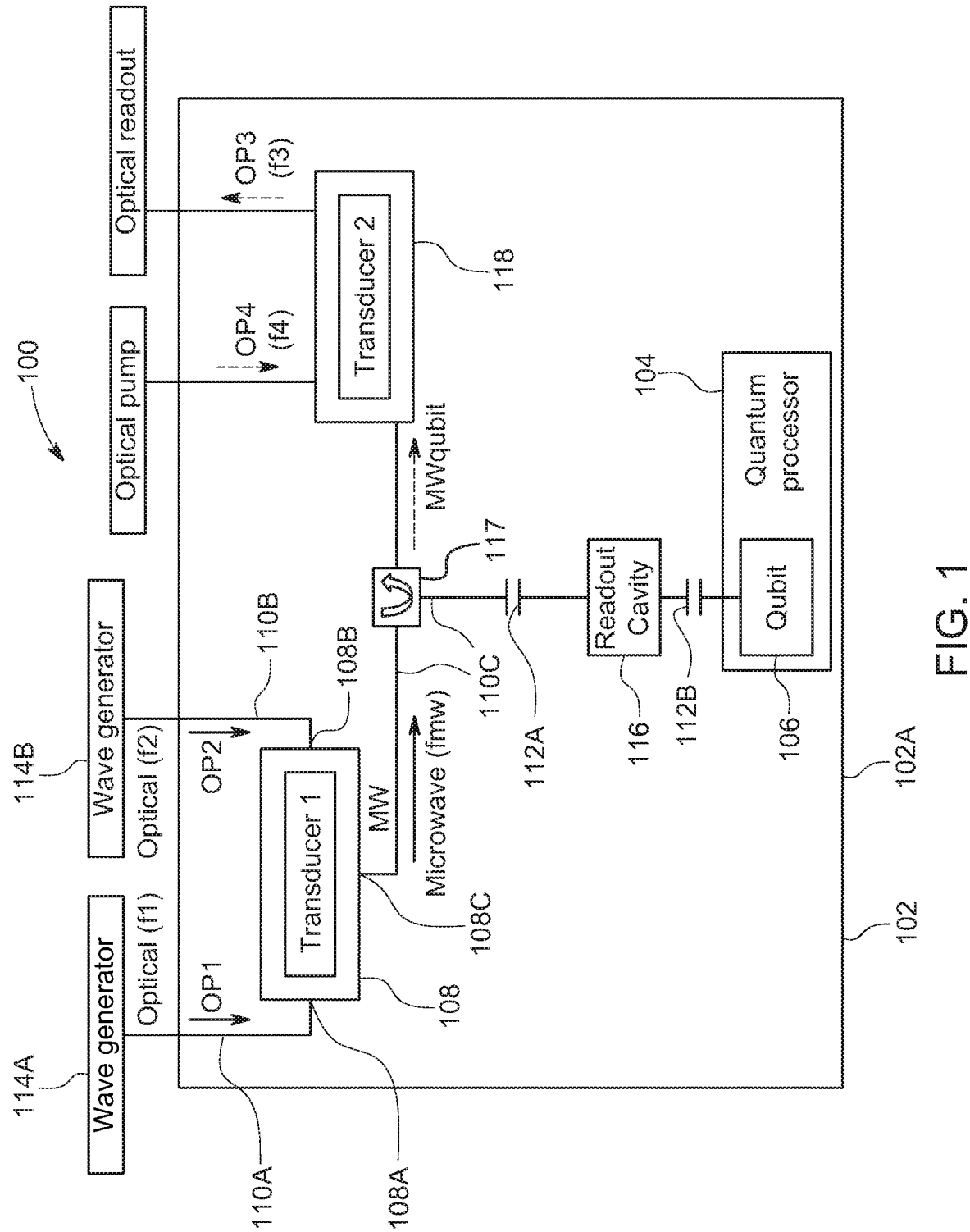
FIG. 1 is schematic representation of a quantum computer, according to an embodiment of the present invention.

FIG. 1 is schematic representation of a quantum computer 100, according to an embodiment of the present invention. The quantum computer 100 includes a quantum computing system 102. In an embodiment, the quantum computing system 102 may include a refrigeration container 102A defining a refrigeration chamber. The quantum computer 100 also includes a quantum processor 104 and one or more transducers 108. In an embodiment, the refrigeration container 102A is configured to house the quantum processor 104 having one or more qubits 106. The refrigeration container 102A is also configured to house the one or more transducers 108. In an embodiment, the quantum computing system 102 may also include integrated control electronics for controlling the quantum processor 104. Although, in this embodiment, the quantum processor 104 including the one or more qubits 106 is described herein being disposed in the refrigeration container 102A, for example when the one or more qubits 106 are superconducting qubits. The quantum processor 106 may also not be disposed inside the refrigeration container 102, for example, in a case where the one or more qubits 106 are not superconducting qubits.

In an embodiment, the refrigeration chamber of the refrigeration container 102A can have a plurality of compartments. Each compartment in the plurality of compartments can be maintained at a different temperature range. In an embodiment, the one or more transducers 108 (e.g., transducer 1) and the one or more qubits 106 are both disposed in a compartment of the plurality of compartments of the refrigeration chamber of the refrigeration container 102A. In an embodiment, the one or more transducers 108 (e.g., transducer 1) and the one or more qubits 106 are both disposed in a same compartment of the plurality of compartments of the refrigeration chamber of the refrigeration container 102A so as to reduce a distance separating the one or more transducers 108 and the one or more qubits 106.

Figure 2:
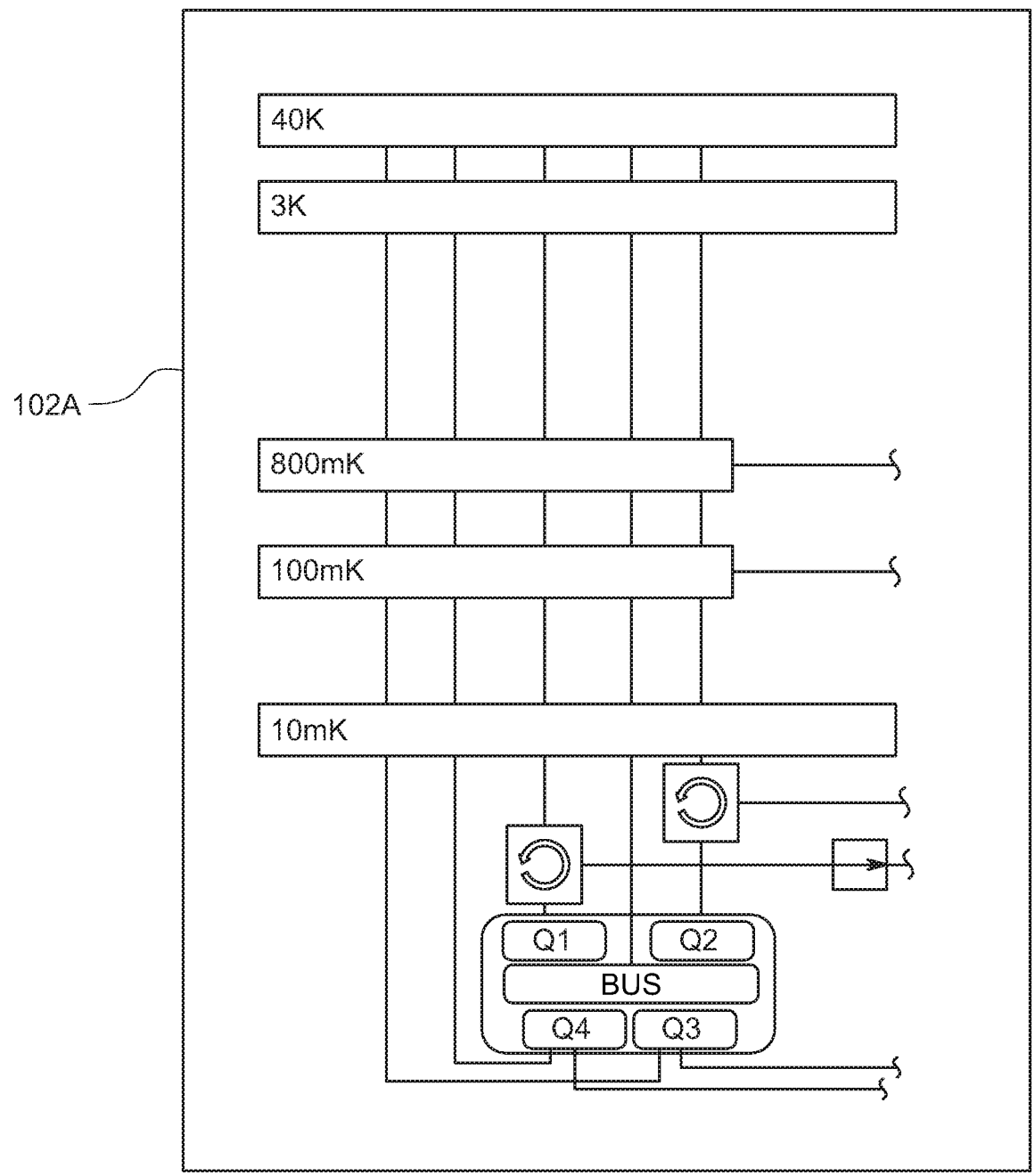
FIG. 2 is a schematic diagram of a refrigeration container with a refrigeration chamber divided into a plurality of refrigeration compartments, each refrigeration compartment being at a certain cooling temperature, according to an embodiment of the present invention.

FIG. 2 is a schematic diagram of the refrigeration container 102A with a refrigeration chamber divided into a plurality of refrigeration compartments, each refrigeration compartment being at a certain cooling temperature, according to an embodiment of the present invention. As shown in FIG. 2, the temperature decreases from the top of the refrigeration chamber to the bottom of the refrigeration chamber with the top compartment of the refrigeration chamber being at about 40 K and the bottom compartment of the refrigeration chamber being at about 10 mK, for example. For example, as shown in FIG. 2, in the case of superconducting qubits, the qubits are disposed within the refrigeration compartment having the lowest temperature. However, as it can be appreciated, other temperature ranges can also be implemented. For example, the one or more transducers 108 (e.g., transducer 1) and the one or more qubits 106 (e.g., Q1, Q2, Q3 and Q4) are disposed in a same refrigeration compartment of the plurality of compartments of the refrigeration chamber of the refrigeration container 102A (the refrigeration compartment at a temperature of approximately 10 mK, for example) so as to reduce a distance separating the one or more transducers 108 and the one or more qubits 106. By reducing the distance, a length of a microwave line between the one or more transducer 108 (e.g., transducer 1) and the one or more qubits 106 can be reduced which allows reducing the effect of heating introduced into the refrigeration container 102A and/or a noise that may be introduced to the one or more qubits 106 by microwave lines.

In an embodiment, the one or more transducers 108 (e.g., transducer 1) disposed inside the quantum computing system 102 is configured to receive an optical control propagating wave (OP1) and output a microwave control propagating wave (MW). In an embodiment, the quantum processor 104 may include a plurality of qubits 106. Each qubit of the plurality of qubits 106 is configured to receive at least a portion of the microwave control propagating wave (microwave fmw) to control a quantum state of each qubit of the plurality of qubits 106.

In an embodiment, the one or more transducers 108 (e.g., transducer 1) is a three-wave mixing optical to microwave transducer. The one or more transducers 108 include a first input port 108A that is configured to receive a first optical control propagating wave (OP1) at a first optical frequency (f1). The one or more transducers 108 include a second input port 108B that is configured to receive a second optical propagating wave (OP2) at a second optical frequency (f2). The second optical frequency (f2) is different from the first optical frequency (f1). The one or more transducers 108 also include an output port 108C configured to output a microwave control propagating wave (MW) at a microwave frequency (fmw). The microwave frequency (fmw) is equal to a difference between the first optical frequency (f1) and the second optical frequency (f2) (i.e., fmw=f1−f2) as a result of a non-linear interaction of the first optical control propagating wave (OP1) and the second optical propagating wave (OP2) in the one or more transducers 108. The microwave control propagating wave (MW) is output by the one or more transducers 108 inside the quantum computing system 102.

In an embodiment, one of the first optical propagating wave (OP1) and the second optical propagating wave (OP2) is a pump propagating wave while the other one of the first optical propagating wave (OP1) and the second optical propagating wave (OP2) is the control propagating wave. For example, the first optical propagating wave (OP1) can be the pump propagating wave while the second optical propagating wave (OP2) can be the control propagating wave. For example, the pump propagating wave (OP1) can be used to pump the one or more transducers 108 (e.g., transducer 1) to supply transduction power, while the control propagating wave (OP2) can be used to produce a control signal for the qubit that after passing through the one or more transducers 108 (e.g., transducer 1), the control propagating wave (OP2) is converted in frequency and generate the microwave propagating wave (MW).

In an embodiment, the one or more transducers 108 (e.g., transducer 1) includes a non-linear material configured to enable a three-wave mixing of the first optical control propagating wave (OP1) and the second optical propagating wave (OP2) to generate the microwave control propagating wave (MW).

In an embodiment, the non-linear material can be selected from the group consisting of an electro-optic material, an opto-electro-mechanical material, a piezo-opto-mechanical material, a magneto-optic material, and a surface-acoustic-wave (SAW) material. In an embodiment, the electro-optic material can be selected from the group consisting of strained silicon (Si), high-voltage silicon, lithium nitride (LiN), and barium titanate (BTO). In an embodiment, the magneto-optic material can include yttrium iron garnet (YIG). In an embodiment, the opto-electro-mechanical material can include a silicon nitride (SiN) membrane. In an embodiment, the piezo-opto-mechanical material can include aluminum nitride (AlN). In an embodiment, the surface-acoustic-wave (SAW) material can be selected from the group consisting of lithium nitride (LiN) and gallium arsenide (GaAs). However, as it can be appreciated, other materials can also be used depending on operating conditions and various physical parameters, including propagating wave energy, power, wavelength or frequency, and/or phase, etc.

In an embodiment, the quantum computer 100 can further include a first optical waveguide 110A connected to the first input port 108A of the one or more transducer 108 (e.g., transducer 1). The first optical waveguide 110A is configured to transmit the first optical control propagating wave (OP1) to the one or more transducers 108 (e.g., transducer 1). In an embodiment, the quantum computer 100 can further include a second optical waveguide 110B connected to the second input port 108B of the one or more transducers 108 (e.g., transducer 1). The second optical waveguide 110B is configured to transmit the second optical propagating wave (OP2) to the one or more transducer 108 (e.g., transduce 1). In an embodiment, the quantum computer 100 can also include a microwave waveguide 110C located inside the quantum computing system 102 and connected to the output port 108C of the one or more transducers 108 (e.g., transducer 1). The microwave waveguide 110C is configured to transmit the microwave control propagating wave (MW) to at least one qubit 106 in the quantum processor 104. In an embodiment, the microwave wave guide 110C can be, for example, a coaxial cable. In an embodiment, the first and second optical waveguides 110A and 110B can be, for example, optical fibers.

In an embodiment, the quantum computer 100 can also include at least one of a filter 112A and attenuator 112B coupled to the microwave waveguide 110C. The filter 112A is configured to filter the microwave frequency (fmw) of the microwave control propagating wave (MW) and the attenuator 112B is configured to control an amplitude of the microwave control propagating wave (MW).

In an embodiment, the quantum computer includes a first waveform generator 114A configured to generate the first optical control propagating wave (OP1) and a second waveform generator 11B configured to generate the second optical propagating wave (OP2).

In an embodiment, the quantum computer 100 includes a plurality of transducers 108 and a plurality of qubits 106 disposed inside the quantum computing system 102. Each transducer in the plurality of transducers 108 is configured to receive an optical control propagating wave (OP1) through a corresponding plurality of optical waveguides 110A and output the microwave control propagating wave (MW) to a corresponding microwave waveguide 110C to transmit at least the portion of microwave control propagating wave (MW) to a corresponding qubit in a plurality of qubits 106 to control a quantum state of the corresponding qubit.

In an embodiment, the quantum computer 100 can include a plurality of optical waveguides 110A and 110B. Each optical waveguide in the plurality of waveguides 110A and 110B is configured to transmit the optical control propagating wave (OP1) and (OP2). In an embodiment, the quantum computer 100 can also include a plurality of microwave waveguides 110C. Each microwave waveguide in the plurality of microwave waveguides 110C is configured to transmit at least a portion of microwave control propagating wave (MW) to separately control the quantum state of each of the plurality of qubits 106. In an embodiment, the quantum computer 100 can include a plurality of filters 112A and attenuators 112B. At least one of a filter and attenuator is coupled to each corresponding microwave waveguide in the plurality of microwave waveguides 110C. The filter is configured to filter a microwave frequency of the microwave control propagating wave and the attenuator is configured to control an amplitude of the microwave control propagating wave (MW) in each of the plurality of the microwave waveguides 110C.

The quantum computer 100 can further include a readout cavity 116. The readout cavity 116 is configured to measure a state of the qubit 106 whose information is contained in MWqubit. The quantum computer 100 can also include a circulator 117. The circulator 117 is configured to receive the microwave propagating wave (MW) (for example via microwave wave guide 110C) and transmit the microwave propagating wave (MW) to the qubit 106. The microwave propagating wave (MWqubit) that contains the information of the qubit 106 state measured by the readout cavity 116 is received by the circulator 117 which then transmits the microwave propagating wave (MWqubit) to another one or more transducers 118 (e.g., transducer 2). The one or more transducers 118 receive the microwave propagating wave (MWqubit) and convert it into an optical readout propagating wave (OP3) for readout.

In order to convert the microwave propagating wave (MWqubit) into the optical readout propagating wave (OP3), a three-wave mixing also takes place in the one or more transducers 118 (e.g., transducer 2) in a similar fashion as described above with respect to one or more transducers 108 (e.g., transducer 1). In this case, to enable a three-wave mixing, an optical pump propagating wave (OP4) is input into the one or more transducers 118 (e.g., transducer 2). In this case also the microwave frequency (fmw) of the microwave propagating wave (MWqubit) is equal to a difference between the optical frequency (f3) of the optical readout propagating wave (OP3) and the optical frequency (f4) of the optical pump propagating wave (OP4) (i.e., fmw=f3−f4) as a result of a non-linear interaction in the one or more transducers 118. Therefore, the frequency (f3) of optical readout propagating wave (OP3) is equal to a sum of the frequency (f4) of the optical pump propagating wave (OP4) and the microwave frequency (fmw) of the microwave propagating wave (MWqubit) (i.e., f3=f4+fmw). By converting microwave frequency (fmw) into optical frequency (f3), optical photon detectors can be used to measure the state of the qubit 106.

Figure 3:
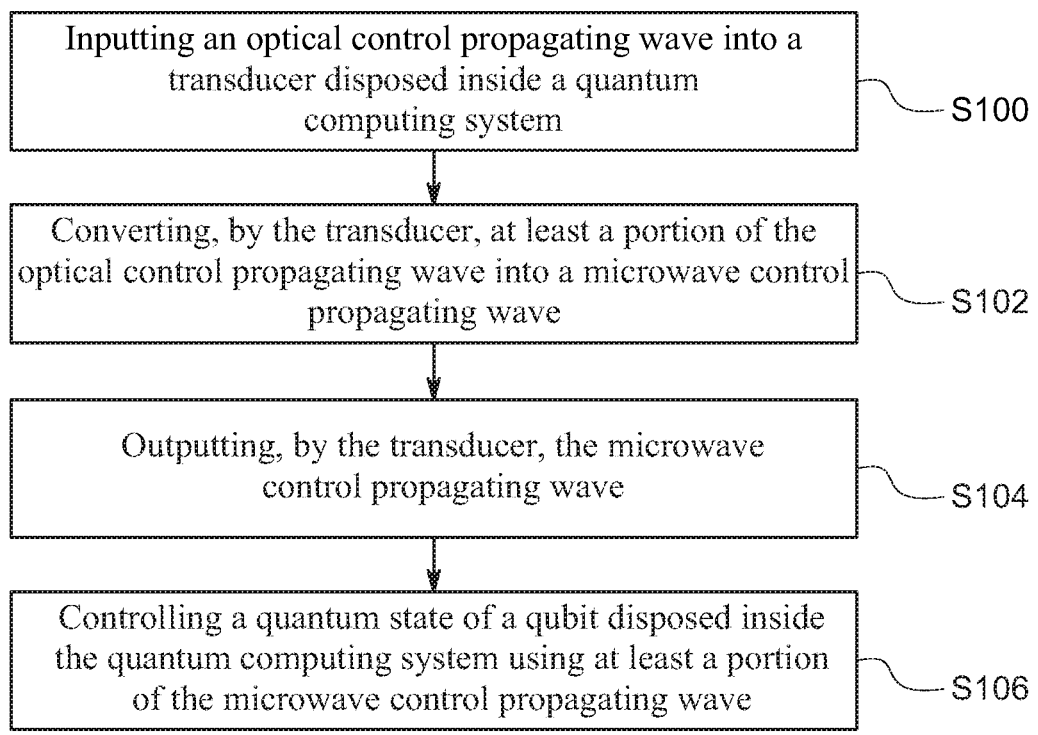
FIG. 3 is a flow chart of a method for optically controlling a quantum state of a qubit, according to an embodiment of the present invention.

FIG. 3 is a flow chart of a method for optically controlling a quantum state of a qubit, according to an embodiment of the present invention. As it must be appreciated from the above paragraphs, the method includes inputting an optical control propagating wave into a transducer disposed inside a quantum computing system, at S100. The method also includes converting, by the transducer, at least a portion of the optical control propagating wave into a microwave control propagating wave, at S102 and outputting, by the transducer, the microwave control propagating wave, at S104. The method further includes controlling a quantum state of a qubit disposed inside the quantum computing system using at least a portion of the microwave control propagating wave, at S106.

In an embodiment, the inputting the optical control propagating wave includes: (a) inputting a first optical control propagating wave at a first optical frequency into a first input port of the transducer; and (b) inputting a second optical propagating wave at a second optical frequency different from the first optical frequency into a second input port of the transducer.

In an embodiment, the converting at least the portion of the optical control propagating wave into microwave control propagating wave includes generating the microwave control propagating wave through a non-linear interaction of the first optical control propagating wave and the second optical propagating wave in the transducer. The microwave control propagating wave has a microwave frequency equal to a difference between the first optical frequency and the second optical frequency.

In an embodiment, the method further includes: (i) transmitting the first optical control propagating wave using a first optical waveguide, the first optical waveguide being connected to the first input port of the transducer; (ii) transmitting the second optical propagating wave using a second optical waveguide, the second optical waveguide being connected to the second input port of the transducer; and (iii) transmitting the microwave control propagating wave to the qubit using a microwave wave guide, the microwave waveguide being connected to the output port.

In an embodiment, generating the microwave control propagating wave through a non-linear interaction of the first optical control propagating wave and the second optical propagating wave in the transducer includes performing a three-wave mixing of the first optical control propagating wave and the second optical propagating wave in a non-linear material of the transducer to generate the microwave control propagating wave.

In an embodiment, the non-linear material is selected from the group consisting of an electro-optic material, an opto-electro-mechanical material, a piezo-opto-mechanical material, a magneto-optic material, and a surface-acoustic-wave (SAW) material. In an embodiment, the electro-optic material is selected from the group consisting of strained silicon (Si), high-voltage silicon, lithium nitride (LiN), and barium titanate (BTO). In an embodiment, the magneto-optic material includes yttrium iron garnet (YIG). In an embodiment, the opto-electro-mechanical includes a silicon nitride (SiN) membrane. In an embodiment, the piezo-opto-mechanical material includes aluminum nitride (AlN). In an embodiment, the surface-acoustic-wave (SAW) material is selected from the group consisting of lithium nitride (LiN) and gallium arsenide (GaAs).

The above described systems and methods provide many benefits including for example reducing or substantially eliminating thermal loads and thermal noise and/or reducing the space that may be occupied by the control and read lines which would enable scaling up the control lines to a higher number of qubits.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A quantum computer comprising:
   a quantum computing system;
   a transducer disposed inside the quantum computing system, the transducer being configured to receive an optical control propagating wave and output a microwave control propagating wave;
   a quantum processor comprising a plurality of qubits, the plurality of qubits being disposed in the quantum computing system, each qubit of the plurality of qubits being configured to receive at least a portion of the microwave control propagating wave to control a quantum state of said each qubit of said plurality of qubits;
   a plurality of optical waveguides, each optical waveguide in said plurality of waveguides being configured to transmit the optical control propagating wave; and
   a plurality of microwave waveguides, each microwave waveguide in said plurality of microwave waveguides being configured to transmit said at least said portion of microwave control propagating wave to separately control the quantum state of each of said plurality of qubits.

2. The quantum computer according to claim 1, further comprising:
   a plurality of transducers disposed inside the quantum computing system, each transducer being configured to receive an optical control propagating wave through a corresponding plurality of optical waveguides and output the microwave control propagating wave to a corresponding microwave waveguide to transmit at least the portion of microwave control propagating wave to a corresponding qubit to control a quantum state of the corresponding qubit.

3. The quantum computer according to claim 2, further comprising at least one of a filter and attenuator coupled to each corresponding microwave waveguide, said filter being configured to filter a microwave frequency of the microwave control propagating wave and said attenuator being configured to control an amplitude of said microwave control propagating wave.

4. The quantum computer according to claim 1, wherein the transducer comprises a non-linear material configured to enable a three-wave mixing of a first optical control propagating wave and a second optical propagating wave to generate the microwave control propagating wave.

5. The quantum computer according to claim 4, wherein the non-linear material is selected from the group consisting of an electro-optic material, an opto-electro-mechanical material, a piezo-opto-mechanical material, a magneto-optic material, and a surface-acoustic-wave (SAW) material.

6. The quantum computer according to claim 5, wherein the electro-optic material is selected from the group consisting of strained silicon (Si), high-voltage silicon, lithium nitride (LiN), and barium titanate (BTO), wherein the magneto-optic material comprises yttrium iron garnet (YIG), wherein the opto-electro-mechanical comprises a silicon nitride (SiN) membrane, wherein the piezo-opto-mechanical material comprises aluminum nitride (AlN), wherein the surface-acoustic-wave (SAW) material is selected from the group consisting of lithium nitride (LiN) and gallium arsenide (GaAs).

7. The quantum computer according to claim 1, wherein the quantum computer system comprises a refrigeration container defining a refrigeration chamber, wherein the quantum processor and the transducer are disposed inside the refrigeration chamber.

8. A system for optically controlling a quantum state of a qubit comprising:
a quantum computing system;
a transducer disposed inside the quantum computing system, the transducer being configured to convert an optical control propagating wave into a microwave control propagating wave, wherein the transducer is a three-wave mixing optical to microwave transducer, comprising:
   a first input port configured to receive a first optical control propagating wave at a first optical frequency; and
   a second input port configured to receive a second optical propagating wave at a second optical frequency, the second optical frequency being different from the first optical frequency;
an output port configured to output a microwave control propagating wave at a microwave frequency equal to a difference between the first optical frequency and the second optical frequency as a result of a non-linear interaction of the first optical control propagating wave and the second optical propagating wave in said transducer, the microwave control propagating wave being output by the transducer inside the quantum computing system; and
at least one qubit disposed inside the quantum computing system, the at least one qubit being configured to receive the microwave control propagating wave to control one or more quantum states of the at least one qubit.

9. The system according to claim 8, further comprising:
a first optical waveguide connected to the first input port of the transducer, the first optical waveguide being configured to transmit the first optical control propagating wave to the transducer; and
a second optical waveguide connected to the second input port of the transducer, the second optical waveguide being configured to transmit the second optical propagating wave to the transducer.

10. The system according to claim 8, further comprising a microwave waveguide located inside the quantum computing system and connected to the output port, the microwave waveguide being configured to transmit the microwave control propagating wave to the at least one qubit.

11. The system according to claim 10, further comprising at least one of a filter and attenuator coupled to the microwave waveguide, said filter being configured to filter the microwave frequency of the microwave control propagating wave and said attenuator being configured to control an amplitude of said microwave control propagating wave.

12. The system according to claim 8, further comprising a first waveform generator configured to generate the first optical control propagating wave and a second waveform generator configured to generate the second optical propagating wave.

13. The system according to claim 8, wherein the transducer comprises a non-linear material configured to enable a three-wave mixing of the first optical control propagating wave and the second optical propagating wave to generate the microwave control propagating wave.

14. The system according to claim 13, wherein the non-linear material is selected from the group consisting of an electro-optic material, an opto-electro-mechanical material, a piezo-opto-mechanical material, a magneto-optic material, and a surface-acoustic-wave (SAW) material.

15. The system according to claim 14, wherein the electro-optic material is selected from the group consisting of strained silicon (Si), high-voltage silicon, lithium nitride (LiN), and barium titanate (BTO), wherein the magneto-optic material comprises yttrium iron garnet (YIG), wherein the opto-electro-mechanical comprises a silicon nitride (SiN) membrane, wherein the piezo-opto-mechanical material comprises aluminum nitride (AlN), wherein the surface-acoustic-wave (SAW) material is selected from the group consisting of lithium nitride (LiN) and gallium arsenide (GaAs).

16. The system according to claim 8, wherein the quantum computing system comprises a refrigeration container defining a chamber having a plurality of compartments, each compartment being at a different temperature range, wherein the transducer and the qubit are both disposed in a compartment of said plurality of compartments.

17. A method for optically controlling a quantum state of a qubit, comprising:
inputting an optical control propagating wave into a transducer disposed inside a quantum computing system;
converting, by the transducer, at least a portion of said optical control propagating wave into a microwave control propagating wave;
outputting, by the transducer, the microwave control propagating wave;
controlling a quantum state of a qubit disposed inside the quantum computing system using at least a portion of said microwave control propagating wave;
inputting a first optical control propagating wave at a first optical frequency into a first input port of the transducer; and
inputting a second optical propagating wave at a second optical frequency different from the first optical frequency into a second input port of the transducer.

18. The method according to claim 17, wherein converting the at least portion of said optical control propagating wave into microwave control propagating wave comprises generating the microwave control propagating wave through a non-linear interaction of the first optical control propagating wave and the second optical propagating wave in said transducer, the microwave control propagating wave having a microwave frequency equal to a difference between the first optical frequency and the second optical frequency.

19. The method according to claim 18, further comprising:
   transmitting the first optical control propagating wave using a first optical waveguide, the first optical waveguide being connected to the first input port of the transducer;
   transmitting the second optical propagating wave using a second optical waveguide, the second optical waveguide being connected to the second input port of the transducer; and
   transmitting the microwave control propagating wave to the qubit using a microwave wave guide, the microwave waveguide being connected to the output port.

20. The method according to claim 19, wherein generating the microwave control propagating wave through a non-linear interaction of the first optical control propagating wave and the second optical propagating wave in said transducer comprises performing a three-wave mixing of the first optical control propagating wave and the second optical propagating wave in a non-linear material of said transducer to generate the microwave control propagating wave.

21. The method according to claim 20, wherein the non-linear material is selected from the group consisting of an electro-optic material, an opto-electro-mechanical material, a piezo-opto-mechanical material, a magneto-optic material, and a surface-acoustic-wave (SAW) material.

22. The method according to claim 21, wherein the electro-optic material is selected from the group consisting of strained silicon (Si), high-voltage silicon, lithium nitride (LiN), and barium titanate (BTO), wherein the magneto-optic material comprises yttrium iron garnet (YIG), wherein the opto-electro-mechanical comprises a silicon nitride (SiN) membrane, wherein the piezo-opto-mechanical material comprises aluminum nitride (AlN), wherein the surface-acoustic-wave (SAW) material is selected from the group consisting of lithium nitride (LiN) and gallium arsenide (GaAs).

\* \* \* \* \*